United States Patent [19]

Seger et al.

[11] Patent Number: 4,593,915
[45] Date of Patent: Jun. 10, 1986

[54] ORIFICE PLATE SEAL RING

[75] Inventors: Harold C. Seger, Dixon; Norman M. Cowan, Fremont, both of Calif.

[73] Assignee: Grove Valve and Regulator Co., Oakland, Calif.

[21] Appl. No.: 675,653

[22] Filed: Nov. 28, 1984

[51] Int. Cl.$^4$ .................... F16J 15/10; F16L 55/10
[52] U.S. Cl. .................... 277/12; 277/166; 138/44
[58] Field of Search .................... 277/12, 32, 166, 178, 277/237, 167.5; 138/44

[56] References Cited

U.S. PATENT DOCUMENTS

| 1,865,795 | 7/1932 | Schnitter | 138/44 |
| 2,278,849 | 4/1942 | Horner | 138/44 X |
| 2,842,962 | 7/1958 | Dall | 138/44 X |
| 3,834,718 | 9/1974 | Gyongyosi et al. | 277/166 |

FOREIGN PATENT DOCUMENTS

B23055  10/1955  Fed. Rep. of Germany ........ 138/44

Primary Examiner—Robert S. Ward
Attorney, Agent, or Firm—Melvin R. Stidham

[57] ABSTRACT

A peripheral seal for an orifice disc in an orifice fitting. The peripheral seal is made of two seal rings both of hard polymeric material with a high elastic modulus. An outer seal ring has a deep recess to receive both the orifice disc and the inner seal ring. The seal rings form a seal around the orifice disc and an annular carrier containing it, as well as with each other, but they are sufficiently hard material that they will not swell or distort under high pressures and/or high temperatures.

6 Claims, 3 Drawing Figures

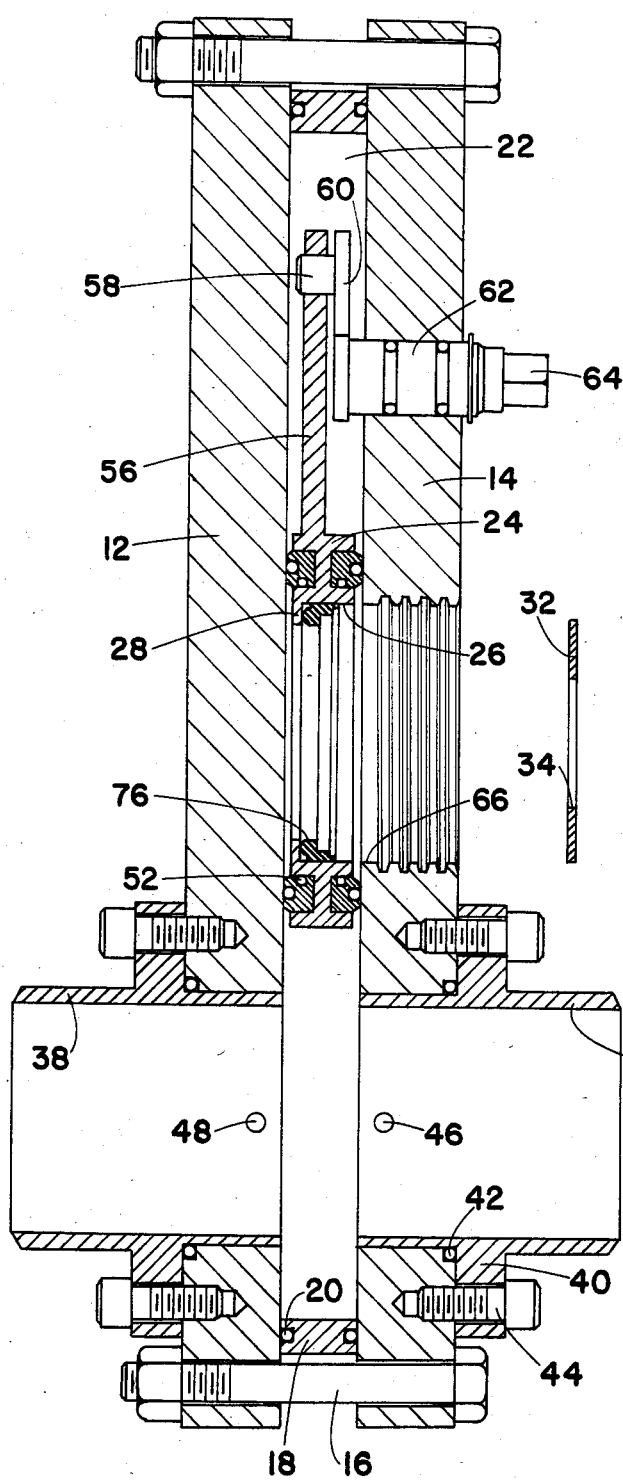
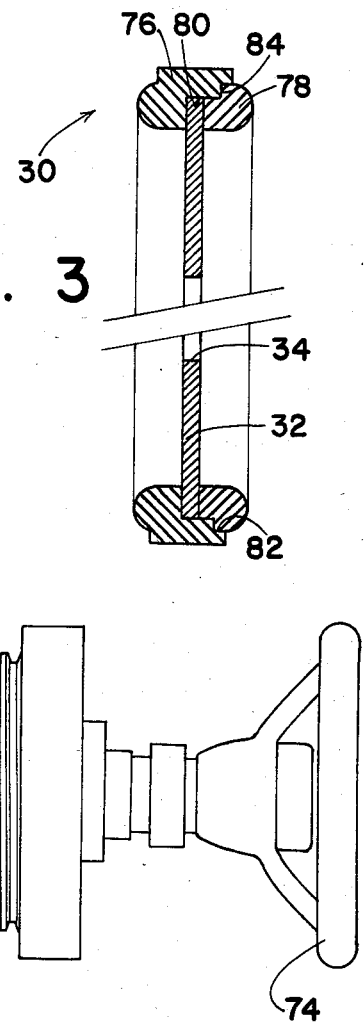
Fig. 3
Fig. 2

ORIFICE PLATE SEAL RING

BACKGROUND OF THE INVENTION

Orifice fittings are commonly employed to measure the volume of gas flowing through a pipeline or from a well. The flowing gas is passed through an orifice of a fixed, predetermined size and the pressure drop across the orifice is measured to determine volume and, hence, total cost of the gas flowing past. Because the orifice plate is subject to wear by impacting of sand, line scale and other foreign particles in the flowing gas stream, it must be replaced at frequent intervals to ensure accuracy in measurement.

Conventionally, the orifice plate is positioned within the body of the fitting across the flow passage with seals closely surrounding it to ensure that all gas flow is through the orifice. In one type of orifice fitting the orifice disc seal ring is generally U-shaped in cross-section and is stretched over the orifice plate to be received and seal around the periphery thereof. In order to apply such a seal ring, it must be made of a soft, low modulus, high elongation material that is easily stretched without breaking or tearing. Such material is generally limited to lower pressure applications, and any attempt to use it in high pressure service, say above 720 p.s.i., may result in swelling and/or blistering failure.

OBJECTS OF THE INVENTION

It is an object of this invention to provide an orifice plate seal ring made of a relatively hard, high modulus polymeric material.

It is a further object of this invention to provide an orifice plate seal ring of a polymeric material that is suitable for use in high temperature and/or high pressure service.

Other objects and advantages of this invention will become apparent from the description to follow, particularly when read in conjunction with the accompanying drawings.

SUMMARY OF THE INVENTION

In carrying out this invention, there is provided an orifice disc peripheral seal ring made of a hard polymeric material having a 100% elastic modulus of 900 p.s.i. or higher that comprises two interfitting, seal ring components. One of the components is of a full diameter ring to engage and seal against the inner diameter of the orifice disc carrier and having a deep annular recess, which opens from one side to receive the orifice disc snugly. A second, smaller seal ring also fits within the annular recess to engage and seal against the outer edge of the orifice disc. While relatively hard, the seal rings are sufficiently resilient that they seal together so that there is no leak path between them.

BRIEF DESCRIPTION OF THE DRAWINGS

In the drawings:

FIG. 2 is a vertical section view of the fitting showing removal of the orifice disc and sealing components; and FIG. 3 is an enlarged section view of an orifice disc seal embodying features of this invention.

DESCRIPTION OF A PREFERRED EMBODIMENT

Figure 1:
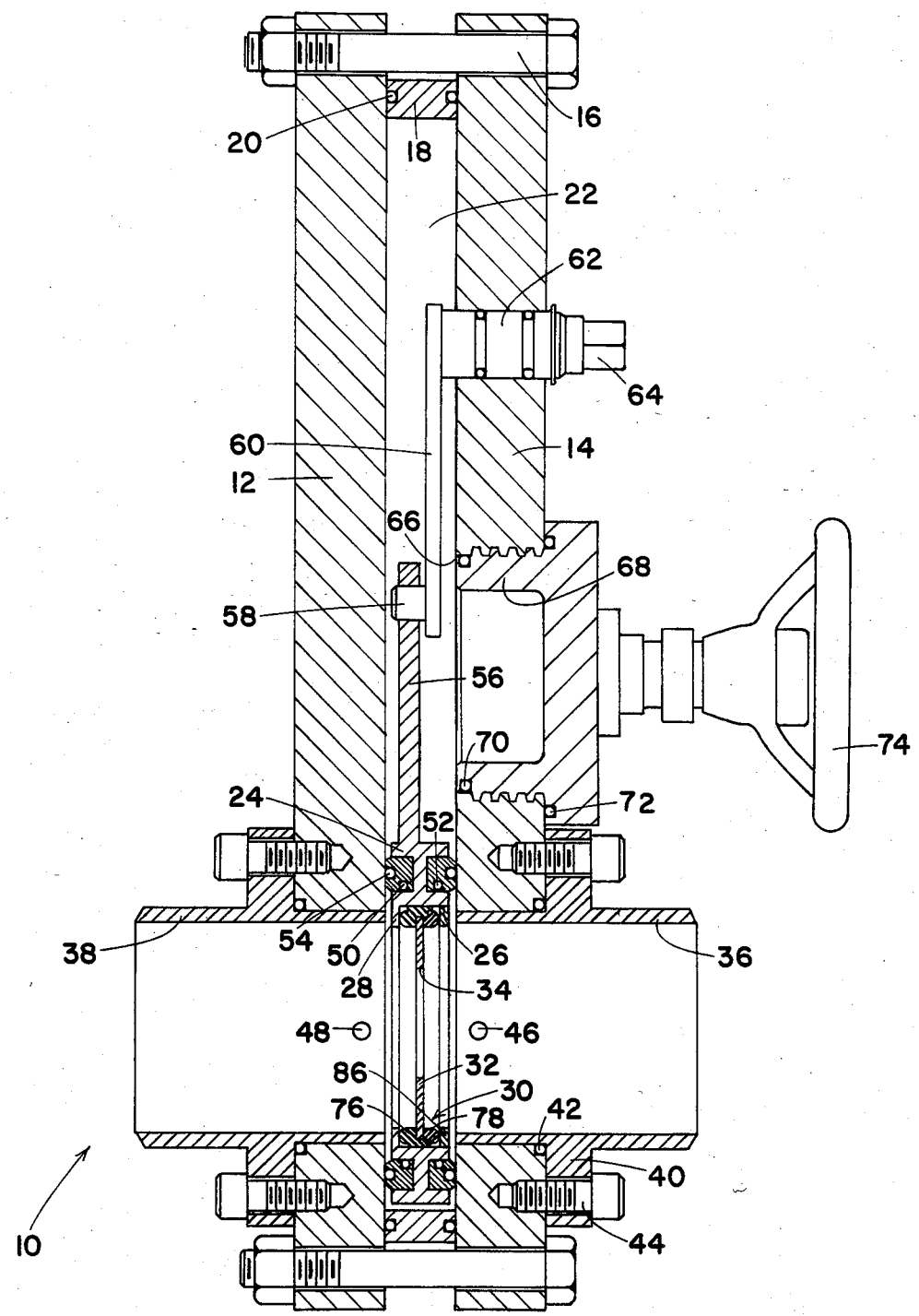
FIG. 1 is a vertical section view of an orifice fitting including the two-piece orifice plate seal ring of this invention in active position.

Referring now to the drawings with greater particularity, the orifice fitting 10 of this invention comprises a pair of parallel steel body plates 12 and 14, which are secured together by a plurality of bolts 16 clamping them against the edges of an oval body band 18 carrying resilient seal rings 20 to form a sealed enclosure 22 between the body plates 12 and 14.

Slidably carried between the parallel plates 12 and 14 is a gate-like carrier 24, which is of annular configuration having a cylindrical recess 26 terminating in an internal stop shoulder 28. Supported against the internal shoulder 28 is the orifice disc peripheral seal ring 30 of this invention, carrying an orifice disc 32 therein. The orifice disc has an aperture 34 therethrough of a predetermined size to produce a pressure drop in a gas flowing therethrough from one flow tube 36 to the other 38.

The flow tubes 36 and 38 may each comprise a section of pipe of predetermined diameter, with an integral mounting ring or shoulder 40. The mounting rings 40 are sealed, by seal ring 42 and are secured to the body plates 12 and 14 by means of cap screws 44. Pressure taps 46 and 48 are drilled at fixed distances upstream and downstream of the orifice disc 32 so that the pressure differential across them can be determined.

Carried on each side of the annular carrier 24 is a seal ring 50 carrying a resilient inner seal 52 and in a resilient main seal 54. The main seals 54 on opposite sides of the carrier 24 maintain constant sealing engagement with the body plates 12 and 14 so that, in any position thereof, the portion of the orifice carrier radially inside of the main seal rings 54 is in sealed isolation from the remainder of the body space 22.

The orifice carrier has an integral panhandle stem 56 which is pivoted at 58 on a crank arm 60 carried on a sealed rotatable shaft 62 with a squared end 64 for partial rotation as by means of a suitable wrench (not shown).

Displaced from the flow tubes 36 and 38 is an orifice disc replacement opening 66 which is of a diameter larger than the inner diameter 26 of the orifice disc carrier but smaller than the diameter of the seal rings 50. This disc replacement opening 66 is normally closed by a closure plug 68 which is threaded to the body plate 14 and sealed against the body plate as by means of O-rings 70 and 72. The plug 68 may be removed and replaced by means of a handwheel 74.

Referring now more particularly to FIG. 3, the orifice disc peripheral seal comprises an outer seal ring 76 and an interfitting inner seal ring 78, both of a polymeric material of at least 80 durometers on the Shore A scale and having a 100% elastic modulus of at least 900 p.s.i. The outer seal ring 76 has a deep annular recess 80 to receive snugly, both the orifice disc 32 and the inner seal ring 78. The outer seal ring also has a shallow surrounding recess 82 in which an outer shoulder 84 on the inner seal ring nests.

On initial installation, the orifice disc 32 and peripheral seal 30 may be installed as a unit or as indicated in FIG. 2, the outer seal ring 76 may be installed into the carrier recess 26 and against the shoulder 28 first. Then, the orifice disc 32 and inner seal ring 78 are inserted into the outer seal ring recess 80. A spacer ring 86 of low friction material is inserted against the peripheral seal 30 and the plug 68 threaded into place. When assembly is completed, the shaft 62 is rotated to move the carrier 24 to its active position, as shown in FIG. 1.

Periodically, the orifice disc 32 must be replaced as the orifice itself 34 becomes damaged. To do so, the reverse procedure is followed and the shaft 62 rotated to move the carrier 24 to the position shown in FIG. 2 opposite the access opening 66. After depressurizing the volume contained within the seal rings 50, by suitable means (not shown), the handwheel 74 is rotated to remove the plug 68. Then, the spacer ring 86 and inner seal ring 78 may be pulled from the deep recess 80 in the outer seal ring 76. The orifice disc 32 is removed and replaced, as are the inner seal ring 78 and spacer ring 86. Then, the plug is threaded back into place; the volume contained within seal ring 50 is again pressurized; and the carrier 24 is moved back to the position shown in FIG. 1.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. In an orifice fitting comprising:
   a body construction having a pair of opposing walls with aligned circular flow passages therethrough;
   an orifice disc carrier between said walls;
   said carrier having a cylindrical recess therein; and
   an orifice disc received in said recess;
   the improvement comprising a peripheral seal for said orifice disc including:
   outer and inner seal ring components of a hard, substantially nonstretchable polymeric material;
   said outer seal ring component having a deep annular recess from one side thereof of a diameter to receive an orifice disc snugly;
   said inner seal ring component being snugly received in said recess.

2. The orifice disc peripheral seal defined by claim 1 wherein:
   said polymeric material is of 80 durometer or more on the Shore A scale, with 100% elastic modulus of 900 p.s.i. or higher.

3. The orifice disc peripheral seal defined by claim 1 including:
   means forming a shallow annular recess in said outer seal ring surrounding said deep recess;
   the full diameter of said inner seal ring being received in said shallow recess; and
   a coaxial annular protrusion on said inner seal ring snugly received in said deep recess to engage around the edge of an orifice disc also received therein.

4. In an orifice fitting comprising:
   a body construction having a pair of opposing walls with aligned circular flow passages therethrough;
   an orifice disc carrier between said walls; and
   annular seal means on both sides of said carrier of a diameter greater than said flow passages and operative to maintain sealing engagement with said opposing walls;
   said carrier having a cylindrical recess therein circumscribed by said seal means; and
   an orifice disc received in said recess;
   the improvement comprising a peripheral seal for said orifice disc including:
   outer and inner seal ring components of a hard, substantially nonstretchable polymeric material;
   said outer seal ring component having a deep annular recess from one side thereof of a diameter to receive an orifice disc snugly;
   said inner seal ring component being snugly received in said recess.

5. The orifice disc peripheral seal defined by claim 1 wherein:
   said polymeric material is of 80 durometer or more on the Shore A scale, with 100% elastic modulus of 900 p.s.i. or higher.

6. For use in an orifice fitting including:
   a body construction having a pair of opposing walls with aligned circular flow passages therethrough;
   an orifice disc;
   a peripheral seal for said orifice disc including:
   outer and inner seal ring components of a hard, substantially nonstretchable polymeric material of 80 durometer or more on the Shore A scale, with 100% elastic modulus of 900 p.s.i. or higher;
   said outer seal ring component having a deep annular recess from one side thereof of a diameter to receive an orifice disc snugly;
   said inner seal ring component being snugly received in said recess.

* * * * *